United States Patent [19]
Chenausky et al.

[11] Patent Number: 4,719,640
[45] Date of Patent: Jan. 12, 1988

[54] MULTIPLE PARALLEL RF EXCITED $CO_2$ LASERS

[75] Inventors: Peter P. Chenausky, Avon; Lanny M. Laughman, Bolton; Erroll H. Drinkwater, Portland, all of Conn.

[73] Assignee: The United States of America as represented by the Secretary of the Army, Washington, D.C.

[21] Appl. No.: 761,256

[22] Filed: Aug. 1, 1985

[51] Int. Cl.[4] .............................................. H01S 3/082
[52] U.S. Cl. ...................................... 372/97; 372/87; 372/82; 372/64
[58] Field of Search ..................... 372/64, 92, 97, 82, 372/62, 87

[56] References Cited

U.S. PATENT DOCUMENTS

| | | | |
|---|---|---|---|
| 4,363,126 | 12/1982 | Chenausky et al. | 372/82 |
| 4,380,077 | 4/1983 | McMahan | 372/62 |
| 4,429,398 | 1/1984 | Chenausky et al. | 372/64 |
| 4,438,514 | 3/1984 | Chenausky et al. | 378/64 |

Primary Examiner—Leon Scott, Jr.
Attorney, Agent, or Firm—Sheldon Kanars; Jeremiah G. Murray; Robert A. Maikis

[57] ABSTRACT

Dual waveguide lasers which are transversely excited in parallel from a common source of radio frequency are provided with one or more channels or bores connecting the laser cavities. The dimensions and configuration of the connecting channels are chosen so that the electric field from the applied RF excitation source will be higher in the connecting channels than in either of the paralleled waveguide gas discharge cavities, or that the electron collision loss to the nearby ceramic and metallic walls will be lower in the connectiong channels than in the aforementioned waveguide cavities. The initial gas breakdown is thus made to preferentially occur in the connecting channels and thus force initiation of both laser cavities simultaneously.

6 Claims, 6 Drawing Figures

MULTIPLE PARALLEL RF EXCITED CO$_2$ LASERS

The Government has rights in this invention pursuant to contract DAAK80-79-C-3202, awarded by the Dept. of the Army.

BACKGROUND OF THE INVENTION

This invention relates to radio frequency (RF) excited waveguide lasers, and more particularly to multiple lasers of this type which are excited in parallel from a common RF source. Dual channel waveguide lasers, such as those disclosed in U.S. Pat. No. 4,241,319, issued on 12/23/80, find numerous practical uses, for example as separate sources of coherent optical flux operating at identical wavelengths or at a fixed frequency or wavelength offset. These dual channel lasers may comprise parallel channels or slots ground in a common ceramic block and may advantageously share certain accessories, for example, optics and an excitation source. Most of the dual or multiple waveguide lasers in the prior art have been provided with DC excitation of the type shown in the aforementioned patent. In DC excited lasers of these types, a longitudinal discharge is set up between a pair of electrodes located at spaced points along the laser cavity. For example a cathode may be located near one end of the cavity, flush mounted in one of the ceramic walls thereof, with an anode similarly mounted in the same wall near the other end of the cavity. For longer cavities it is necessary to set up two separate discharges, for example with a cathode electrode near the center of the cavity and anodes at either end. A single DC excitation source can be used to supply both of these parallel DC discharges, however a separate ballast resistor must be used for each discharge to ensure that both discharges will initiate. As is well known in the gas laser art, if several gas discharge devices are connected in parallel to a single DC voltage source via a single ballast, or current limiting resistor, the initiation of a discharge in one of the devices will lower the voltage applied to all the other devices below their ionization voltages, due to the voltage drop in the single ballast resistor. For this reason, paralleled DC excited multiple laser discharges must be provided with excitation sources and circuit arrangements substantially more sophisticated than that required to initiate single discharge arrangements.

Radio frequency excitation is advantageous in that the gas discharge can be established between extended ceramic or metallic surfaces; the discharge is sustained by a high frequency polarity reversing energizing source and hence polarity dependent electrode effects are eliminated. Also, the frequency of the applied AC, or RF source can be independently chosen to be faster than the buildup time of an undesired plasma instability. Transverse radio frequency excitation is a further refinement which results in a drastic reduction of the required supply voltage for a given discharge volume. For example, a 0.25 cm. square by 37. cm. long He, N$_2$, CO$_2$ gas laser operating with a gas mixture of He:N$_2$:CO$_2$::6:1:1 at a total pressure of 100. torr requires a discharge sustaining voltage of approximately 9. volts for each cm. of discharge length per torr of total operating pressure. A 37. cm. long longitudinal discharge using either DC or RF excitation would require therefore a maintaining potential of approximately 33. kilovolts. A transverse discharge having the same volumetric dimensions as the longitudinal geometry, namely 0.25 cm. square by 37. cm. long, but having the discharge established across the 0.25 cm. dimension would require a maintaining potential of approximately 225. volts, a voltage reduction by a ratio of 0.25 to 37. This voltage reduction allows the laser designer to utilize discharge geometries which are substantially all metal rather than be constrained to highly insulating, essentially all ceramic configurations. Further, the multiple or dual waveguide lasers of the types described above can all be excited from a common pair of planar electrodes to which the radio frequency source is applied. This simplifies the excitation apparatus and circuitry of RF excited multiple waveguide lasers. Future applications of multiple, parallel RF excited CO$_2$ waveguide type laser might be laser linear phased arrays. Such multiple laser arrays could be either pulsed or continuous wave and might be part of a sophisticated scanning system of an optical radar or communications system.

The use of a single RF source to excite numerous transverse laser discharges in parallel can also result in improved impedance matching and hence permits a larger number of electrical and mechanical design choices to be considered as candidates for a given laser mission. For example, for the aforementioned 37. cm. long by 0.25 cm. square, 100. torr transverse discharge device, power outputs of approximately 85. watts per meter of discharge length and discharge electrical efficiencies of 10% have been achieved when constructed according to the teachings of U.S. Pat. Nos. 4,363,126, issued on 12/7/82 and 4,443,877, issued on 4/17/84, both invented by Chenausky, et al. For the nominally stated operating potential of 225. volts, the 37. cm. long device achieved a CO$_2$ laser output power of 31. watts with a discharge input power of 325 watts using 147. MegaHz excitation. Using Ohm's law, this transversely excited device has a discharge impedance of approximately 156. ohms. Longitudinally excited DC CO$_2$ lasers similar in overall length to the transverse device typically would produce 20. watts output at 15% discharge electrical efficiencies using a split discharge electrode geometry operating with a discharge voltage of approximately 16. kilovolts. Using Ohm's law, the discharge impedance would be approximately 4. megohms. Clearly, with respect to longitudinal DC excitation, large value of discharge series ballast resistance will be required to maintain discharge stability. Interestingly, the nominal 4. megohm discharge impedance level is so high that longitudinal excitation with an RF source can be considered to be impractical for this case. However, three 37. cm. long transversely excited RF discharges operated electrically in parallel and optically in series have been observed to have an electrical input impedance near 50. ohms. with an output optical power of approximately 60. watts. This observed impedance level is between commonly available 50 and 75 ohm coaxial transmission cables and hence underscores the beneficial effects of operating transversely excited RF discharges in parallel.

In the prior art the use of transversely excited waveguide type gas lasers with a common RF excitation source has not been widespread. This has occurred in part because of the unavilability of electrically robust high power excitation sources. In part however, the use of multiple parallel RF excited discharges have not become widespread because of the general technical difficulty associated with operating non-linear electrical devices in parallel, namely the problem of current sharing. With DC excited gas lasers the problem manifests itself when less than the total number of discharges initiate. RF devices, particularly transverse discharge devices to which this invention relates, has an additional complication, namely that the gas discharge initiation-circuit interaction process is fundamentally less well understood.

For example, prior to full discharge initiation in an RF excited gas discharge device, voltage for the pre-breakdown process is derived from a voltage developed across the cold circuit. The cold circuit impedance is necessarily designed to be very much different than the hot circuit (cold circuit in shunt or in series with the discharge), otherwise the resulting laser efficiency will be largely determined by the RF power delivered to the cold circuit losses. Unfortunately, therefore, an external impedance matching circuit must be used between the energizing RF source and the cold discharge circuit to effect sufficient RF power transfer for the discharge process to initiate. The matching circuit thus designed will not yield optimum power transfer to the steady-state fully energized gas discharge. Conversely, a matching circuit designed to transfer RF power efficiently in the steady-state fully energized case, will not necessarily transfer sufficient power to start the discharge process. Clearly, this is not only a more complicated situation than the comparable DC excited discharge case but would seem to become less tractable as more RF discharges are added in parallel with a single discharge device.

SUMMARY OF THE INVENTION

One aspect of the invention comprises a pair of parallel waveguide type gas laser cavities with one or more channels or bores connecting the laser cavities in such a way that either the electric field from the applied single RF excitation source will be higher in the aforementioned connecting channels than in either of the paralleled waveguide gas discharge channels, or that the electron collision loss to the nearby ceramic or metallic walls of the connecting channels will be lower than that in the parallel waveguide gas discharge channels. The result is that the initial gas breakdown can be made to preferentially occur in the common connecting channels and therefore force initiation of both laser discharge channels simultaneously. Moreover, by placing the connecting channels at the ends of the parallel gas laser discharge channels, it has been found that the full length of the transverse discharge could be maintained at lower overall RF input power than in the case with only a centrally located connecting channel.

The initiation of the gas discharge in the auxiliary connecting channel or channels, occurs because of two favorable effects. First the upper electrode of the structure is provided with a machined ceramic piece in such a way that an acute angle there between is formed. This geometry results in a purposefully high electric field at the apex where the metal electrode, the ceramic waveguide subassembly and the residual gas ballast are coplanar. This high electric field region is believed to be the source of the initial gas breakdown. Secondly, the volumetric region where this initial gas breakdown occurs is arranged so that the electron collision loss to the nearby metal and ceramic surfaces is reduced since the high local electric field point is not a completely enclosed region.

After the initial breakdown has occurred, the slightly more efficient power transfer from the constant impedance RF excitation source to the gas can now occur, hence the volume of the gas discharge increases until two or more parallel waveguide gas discharge volumes are completely broken down. This process occurs on a microsecond or submicrosecond timescale as observed with RF directional couplers.

One aspect of this invention is the realization that when multiple parallel RF excited gas laser discharge devices are appropriately designed they exhibit an unexpected and beneficial tendency toward simultaneous initiation. Moreover, in cases where simultaneity is not achieved, a second laser discharge channel with a commonly shared energizing electrode configuration is observed to subsequently initiate when additional RF input power is applied to the circuit. This is operationally in contradistinction to comparable ballasted DC excited devices.

One object of the present invention is to moderate the mismatch between the normally employed RF transmission cable impedance and the commonly encountered higher RF discharge impedance by employing multiple discharges, thereby lowering the total discharge impedance to a value more nearly equal to the cable impedance.

Another object of the invention is to provide twin lasers of the RF excited type with a novel and useful connecting channel or channels between the cavities thereof.

These and other objects and advantages of the invention will become apparent from the following detailed description and the drawings.

DETAILED DESCRIPTION OF PREFERRED EMBODIMENTS

Figure 1:
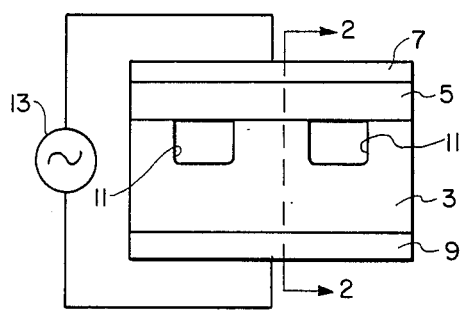
FIGS. 1 and 2 are end and side views of dual channel waveguide lasers to which the present invention can be applied.
Figure 2:
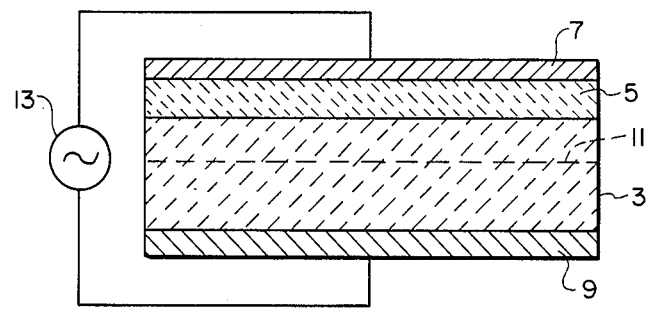

FIG. 1 is an end view of twin or dual cavity waveguide lasers in which the parallel laser cavities comprise adjacent slots or channels 11, ground in a block 3 of insulating material, which may for example be a hard, fired refractory ceramic. A flat top cover 5 of the same insulating material is placed over the parallel channels 11 to form the top wall of the rectangular laser cavities. A pair of parallel flat metallic electrodes 7 and 9 are mounted respectively above top cover 5 and below block 3, as shown. The RF excitation source 13 has its output connected to electrodes 7 and 9 so that the transverse RF excitation to the two laser cavities are electrically in parallel. FIG. 2 is a side view of the twin lasers, as viewed along lines 2—2 of FIG. 1. More than two electrically paralleled cavities can be excited by the same RF excitation source, and further the multiple parallel RF excited waveguide laser cavities need not be formed in a unitary structure as illustrated, but may comprise separate units with separate pairs of electrodes like 7 and 9 of FIGS. 1 and 2, which are all connected in parallel across the common RF excitation source. Also, as mentioned above, the total paralleled impedance of all of the laser cavities should be matched to the source impedance of the RF excitation source. This impedance matching can be augmented for example with the aid of an inductor in parallel with the laser cavity discharge chambers or cavities whereby the parallel tuned circuit formed by the inductor and the cavity electrical capacity will have a real component of complex impedance equal to the real impedance, typically 50 ohms, of the RF excitation source, and wherein the imaginary portion of the parallel tuned circuit impedance is compensated for by either a series resonant circuit or a series element having a conjugate imaginary impedance at the frequency of the RF excitation source. These impedance matching principles for a single cavity waveguide laser are explained in greater details in U.S. Pat. No. 4,363,126 of the present inventors, issued on 12/7/82. It is a simple matter to extend the impedance matching techniques described therein to multiple parallel laser cavities such as those contemplated by the present invention.

FIGS. 3-6 show two different versions of one aspect of the invention which comprises novel apparatus including a pair of parallel laser cavities formed or machined in a common insulated block with a metallic cover which forms the fourth wall of the two cavities and which includes one or more cutaway sections or recesses providing a connecting channel between the adjacent cavities. Such a connecting channel has been found to yield highly reliable simultaneous initiation of the gas discharge in the two laser cavities at even lower values of applied RF power from the excitation source than can be achieved in conventional unconnected geometries.

Figure 3:
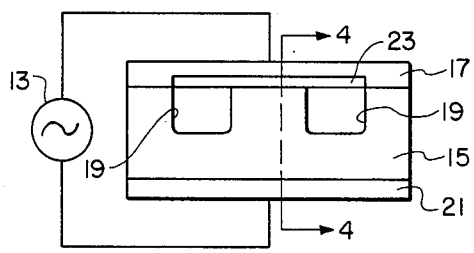
FIGS. 3 and 4 are end and side views of dual channel waveguide lasers with novel connecting channels therein.

The twin, paralleled lasers shown in the end view of FIG. 3 comprise for example, block 15, which may be of a hard ceramic such as alumina or berylia, with the parallel laser cavities 19 formed therein, for example by a grinding process such as described in a co-pending application of the present inventors entitled, GROUND SLOT WAVEGUIDE LASER, Ser. No. 712,943, filed on Mar. 18, 1985, now Statutory Invention Registration No. H199, published Jan. 6, 1987. In the waveguide lasers of FIGS. 3 and 4 herein the ceramic top cover is omitted and the flat metallic electrode 17 is placed over the block 15 to form the fourth wall of the laser cavities. The other flat electrode 21 is applied to the bottom of block 21 and the two electrodes are connected to RF excitation source 13 to provide a transverse RF excitation field within both of the laser cavities. The two laser cavities are provided with two of the aforementioned connecting channels by means of recesses 23 and 25 formed by chamfering both ends of upper electrode 17, as shown. The chamfered areas 23 and 25 form connecting channels of triangular cross section at both ends of the laser cavities. The chamfered areas are on the lower edges of the ends of the rectangular upper electrode 17, and extend from the outer wall of one laser cavity to the outer wall of the other laser cavity. The chamfered sections however could be shorter than this since it is only necessary to form a channel which connects the adjacent laser cavities. The lasing gas completely occupies both laser cavities as well as the connecting channels since these electrical assemblies can be contained in a metalic vacuum housing. It has been found by the present inventors that if the RF excitation voltage from source 13 is gradually increased, the electrical discharge in the lasing gas will initiate in one or both of the connecting channels and will rapidly spread to both laser cavities. Further, it has been found that with this novel structure, the RF power required for reliable simultaneous initiation of the discharge in both cavities is even less than that for the conventional twin laser structure shown in FIGS. 1 and 2. For example, the power of RF excitation source 13 in the embodiments of FIGS. 3-6 need only be essentially that required to initiate a single gas discharge in either of the two parallel laser cavities, if separately excited by a similar RF excitation system.

Figure 4:
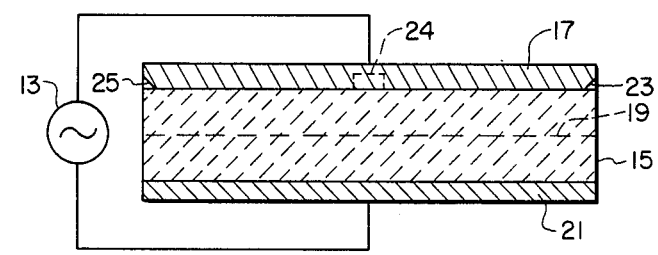
Figure 5:
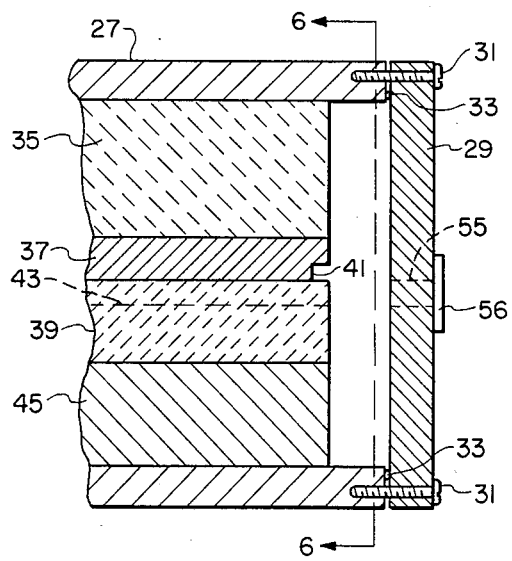
FIGS. 5 and 6 are side and end views of dual channel lasers with a different type of connecting channel.

The laser cavities of FIGS. 3 and 4 have the connecting channels at both ends thereof, however a single connecting channel at one end, would also function in substantially the same way with the exception that a single connecting channel will be ineffective in promoting end-to-end simultaniety. Further, a single channel could be provided near the center of the upper electrode 17 by cutting a slot therein. Such a central slot would be easiest to form with either a square, rectangular or semi circular cross section. The chamfered shape of the recesses in FIGS. 3 and 4 were chosen mainly for ease of manufacture and other cross sections are possible. For example the twin lasers of FIGS. 4 and 5 are provided with a recess 41 of square cross section. The recesses 23 and 25 may be at a 45° angle to the flat electrode 17 and the two sides of the isosceles triangle forming the cross section of the recess may be one eighth of an inch in length. FIG. 4 shows at 24 a single centrally located slot of the type referred to above which could be used instead of the two chamfered recesses 23 and 25.

The reason for the initiation of the electrical discharge in the connecting channel is apparent from the end view of the laser cavities in FIG. 3. Assume that the hard ceramic material of block 15 is alumina or berylia, the dielectric constants of which are approximately 8.8 and 6.6 respectively. The low pressure lasing gas which occupies both cavities and the connecting channels has a dielectric constant of substantially unity. Thus the electric potential due to the applied RF excitation votage will be approximately the same across each of the cavities 19 as it is across the connecting channel 23. Since the channel 23 has a much smaller "air gap" or height than do either of the laser cavities, the potential gradient or electric field strength will be correspondingly larger in the connecting channel. This stronger electric field cause the electric discharge to begin in this region.

Figure 6:
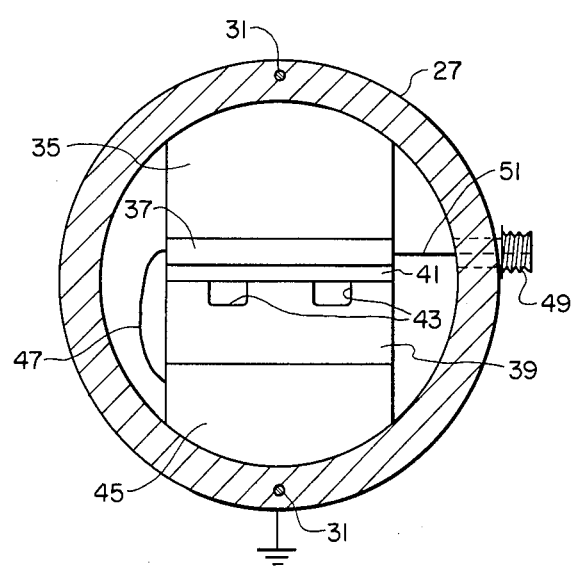

The dual, parallel excited gas lasers of FIGS. 5 and 6 show in the cross sectional side view of FIG. 5 a connecting channel 41 of square cross section cut in the upper electrode 37 at one end thereof. As shown in the end view of FIG. 6, the parallel laser cavities are formed in the upper surface of a ceramic block 39 and the upper electrode 37 forms the top wall of the laser cavities. With a recess with square or rectangular cross sections, the height of the recess, which determines the height of the so called "air gap" should be less than one half the height of the laser cavities. This means that the RF electrical field strength or gradient in this air gap region will be approximately twice what it is in the laser cavities.

The twin lasers of FIGS. 5 and 6 are shown mounted in a metallic vacuum envelope or housing 27 which serves as an electric shield and also as a container for the laser gas which may for example be a mixture of $CO_2$, $N_2$ and He at a total pressure of 70 torr having a mixture ratio of 1:1:6 respectively. The end of the housing 27 is sealed by circular cover 29 held in place by screws 31 and sealed with an O-ring 33. A hole 55 in cover 29 is lined up with the two cavities 43 and laser mirror 56 is mounted on the outside of cover 29 over the hole 55.

The end view of FIG. 6 shows the dual waveguide laser structure mounted and held in place in housing 27 by the lower metallic electrode 45 which has its lower surface shaped to match the circular contour of housing 27, and which has a flat upper surface which abuts the lower surface of block 39, and by the insulating support 35. The insulating support 35 is similar in shape to lower electrode 37 and its flat surface abuts the upper electrode 37, as shown. The support 35 may be of the same hard ceramic material as the block 39.

The RF excitation voltage is applied to the upper electrode 37 from lead 51 which is connected to the center conductor of a coaxial cable (not shown) which is applied to terminal 49. The outer conductor of the cable is grounded to housing 27 through terminal 49 which provides the connection to lower electrode 45. The metal strap 47 connected between the upper and lower electrodes forms a one turn inductor used for impedance matching purposes as explained above.

While the invention has been described in connection with preferred embodiments, obvious variations therein will occur to those skilled in this art without the exercise of invention, accordingly the invention should be limited only by the scope of the appended claims.

What is claimed is:

1. Twin laser apparatus of the waveguide type comprising
    a block of ceramic material having a pair of oppositely-disposed flat parallel surfaces;
    a pair of slots formed in one of said pair of block surfaces, said slots being parallel to each other and extending between the ends of said block;
    a first flat metallic electrode disposed on said one surface of said block and covering both of said slots and a second flat electrode disposed on the other surface of said pair of block surfaces, so that each of said slots cooperates with said first electrode to form a separate laser cavity, said first electrode having at least one recessed portion formed therein extending between and communicating with said pair of slots to form a connecting channel between said slots said at least one recessed portion formed in said first electrode providing a preferential initial breakdown of a lasing gas in said connecting channel which forces simultaneous initiation of a lasing discharge in both of said laser cavities;
    means for coupling said first and second electrodes to a source of RF excitation.

2. Apparatus as claimed in claim 1 wherein said first electrode recessed portion has a depth less than one half of the depth of said slots.

3. Apparatus as claimed in claim 2 wherein said first electrode recessed portion comprises a third slot formed in the surface of said first electrode which abuts said one surface of said block and said third slot is disposed intermediate the ends of said block.

4. Apparatus as claimed in claim 2 wherein said first electrode recessed portion comprises a stepped lower edge of one of the ends of said first electrode adjacent one end of said block so that said stepped lower edge cooperates with said one surface of said block to form a third slot.

5. Appparatus as claimed in claim 1 wherein said first electrode recessed portion comprises a chamfered lower edge of one of the ends of said first electrode adjacent one end of said block so that said chamfered lower edge forms an acute angle with said one surface of said block.

6. Apparatus as claimed in claim 1 wherein
    said first electrode has two of said recessed portions formed therein so that two of said connecting channels are formed between said slots, and
    said first electrode recessed portions comprise chamfered lower edges of the ends of said first electrode adjacent the ends of said block so that each of said chamfered edges forms an acute angle with said one surface of said block.

* * * * *